Figure 1:
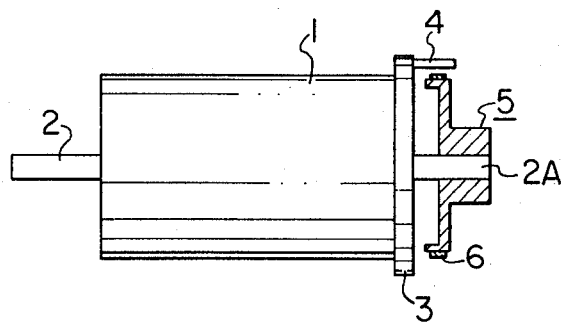

United States Patent [19]

Funada et al.

[11] Patent Number: 4,464,278
[45] Date of Patent: Aug. 7, 1984

[54] COMPOSITION FOR FORMING THICK MAGNETIC RECORDING MEDIUM

[75] Inventors: Ryuichi Funada; Masato Nakaya, both of Hitachi, Japan

[73] Assignee: Hitachi, Ltd., Tokyo, Japan

[21] Appl. No.: 518,111

[22] Filed: Jul. 28, 1983

[30] Foreign Application Priority Data

Aug. 4, 1982 [JP] Japan .................. 57-135238

[51] Int. Cl.³ .................. G11B 5/70; G11B 5/68; H01F 1/26
[52] U.S. Cl. .................. 252/62.54; 427/128; 427/132; 428/64; 428/900
[58] Field of Search .................. 252/62.54; 427/128, 427/132; 428/64, 900

[56] References Cited

U.S. PATENT DOCUMENTS

| | | | |
|---|---|---|---|
| 3,781,211 | 12/1973 | Lohoff | 252/62.54 |
| 4,302,510 | 11/1981 | Umeki et al. | 252/62.54 |
| 4,307,154 | 12/1981 | Hosaka | 252/62.54 |
| 4,329,398 | 5/1982 | Hosaka et al. | 252/62.54 |
| 4,391,864 | 7/1983 | Hosaka et al. | 428/64 |
| 4,396,659 | 8/1983 | Shibata et al. | 428/900 |
| 4,397,751 | 8/1983 | Dickstein et al. | 428/694 |
| 4,420,531 | 12/1983 | Tokuda | 252/62.54 |

Primary Examiner—Arthur P. Demers
Attorney, Agent, or Firm—Antonelli, Terry & Wands

[57] ABSTRACT

A composition comprising 70% by weight or less of magnetic particles and 30% by weight or more of a resin mixture of (a) an epoxy resin, (b) a phenol resin and (c) polyvinyl butyral, the weight ratios of the resin components being (b)/(a)=2.5/7.5 to 4/6 and (c)/(a)+(b)=2.5/7.5 to 4/6, can give a thick magnetic recording medium excellent in film strength, resistance to cracks and durability by screen printing by one coating.

16 Claims, 3 Drawing Figures

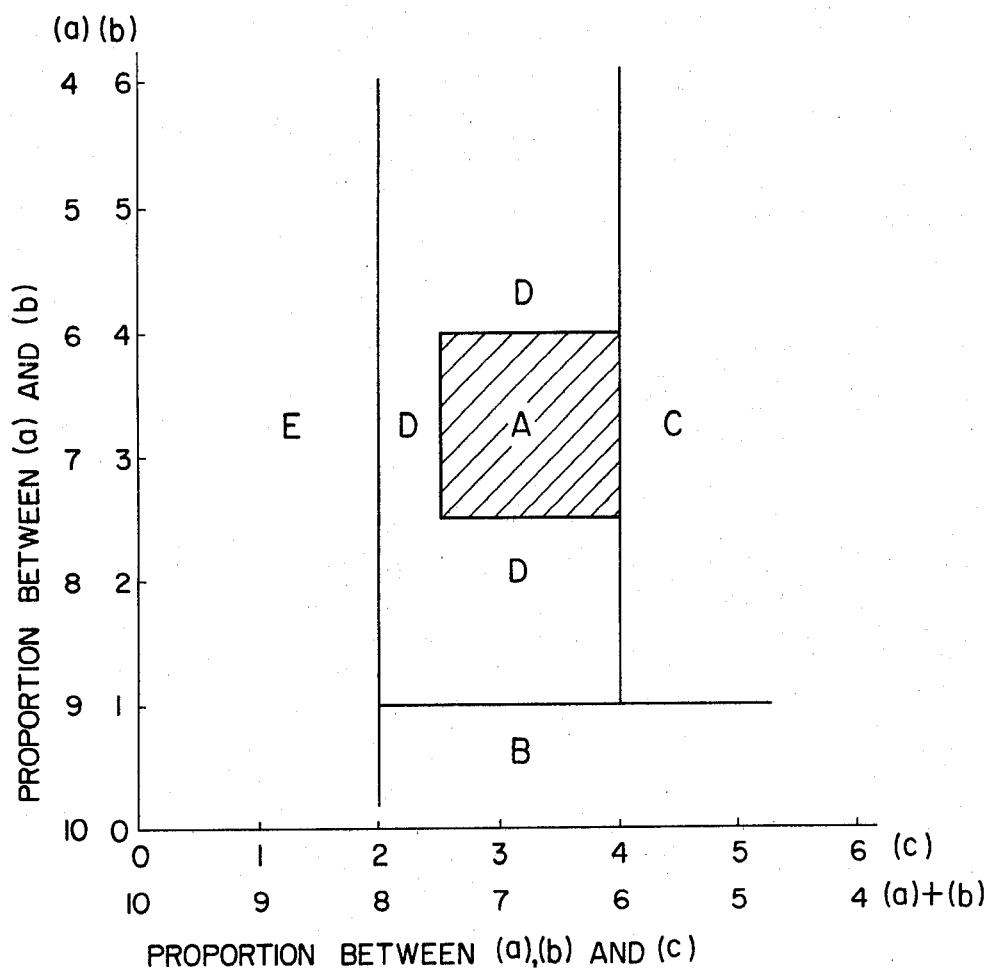

COMPOSITION FOR FORMING THICK MAGNETIC RECORDING MEDIUM

This invention relates to a composition for forming a thick magnetic recording medium used as a magnetic recording disc, a drum, etc., and particularly suitable for use as magnetic recording disc used in a magnetic rotary encoder wherein a magnetic detecting element does not contact with a magnetic recording medium and a motor is installed therein.

Generally speaking, requirement of mechanical strength of magnetic recording medium for magnetic recording disc is severe. The magnetic recording medium is required to be thin and to have sufficient mechanical strength in a uniform state not only in the case where the magnetic recording medium contacts with a magnetic head but also in the case where the magnetic recording medium does not contact with a magnetic head (the magnetic head floating over the rotating magnetic recording disc with high speed). As a magnetic recording medium composition for magnetic disc wherein a magnetic recording medium having increased coating film strength is formed by baking and curing said composition at a lower temperature, there is proposed a composition comprising a magnetic powder, thermosetting resins and 5 to 20% by weight of α-alumina based on the weight of the magnetic powder (Japanese Patent Application Kokoku (Post-Exam Publn) No. 49961/77). Said Japanese patent application Kokoku discloses a mixture of an epoxy resin, a phenol resin and polyvinyl butyral in a solid content weight ratio of 4:1:2 as the thermosetting resins and states that in order to improve the strength of magnetic recording medium and to conduct curing at a lower temperature, it is necessary to add 5% by weight or more of α-alumina based on the weight of the magnetic powder. Further, according to said Japanese patent application Kokoku, said composition is coated on an aluminum disc with a thickness of about 2 μm by a spin coating method and cured by baking at 180° C. for 30 minutes.

But in the case of non-contact type magnetic recording disc, it is necessary to increase the thickness of magnetic recording medium in order to prevent a decrease in output voltages. Particularly in the case of the magnetic recording disc used in a magnetic rotary encoder, it is necessary to make the thickness 10 μm or more. In such a case, when the spin coating method is used as disclosed in said Japanese patent application Kokoku No. 49961/77, several times or more of coating steps are necessary and a loss of the materials during the coating steps is very large, so that such a spin coating method is remarkably disadvantageous in industrial production.

On the other hand, as a method for obtaining a film thickness of 10 to 200 μm by one coating, there is a screen printing method. But when a known magnetic recording composition is used in the screen printing method, there arise many problems in that the composition is dried and solidified on a screen, a thick film cannot be obtained, coating of several times in order to obtain a thick film causes cracks and voids, and the like. For example, since the composition disclosed in said Japanese patent application Kokoku No. 49961/77 contains as solvent toluene which is apt to destroy the emulsion constituting the screen, said composition cannot be used for screen printing. Further, when the thermosetting resins disclosed in said Japanese patent application Kokoku are used in the mixing ratio disclosed therein, there are produced cracks after curing of the resins and the desired thick magnetic recording medium cannot be obtained, even if the solvent is replaced by one suitable for screen printing.

It is an object of this invention to provide a composition for forming a thick magnetic recording medium by screen printing method overcoming the disadvantages mentioned above, said thick magnetic recording medium which is excellent in adhesiveness, resistance to cracks, mechanical strength, and the like and has a thickness of 10 to 200 μm being able to be formed freely by selecting suitable screens by one step.

This invention provides a composition for forming a thick magnetic recording medium comprising 70% by weight or less of magnetic particles and 30% by weight or more of a resin mixture of (a) an epoxy resin, (b) a phenol resin, and (c) polyvinyl butyral, the weight ratio of the phenol resin to the epoxy resin (b)/(a) being 2.5/7.5 to 4/6 and the weight ratio of the polyvinyl butyral to the total of the phenol resin and epoxy resin (c)/(a)+(b) being 2.5/7.5 to 4/6.

Figure 2:
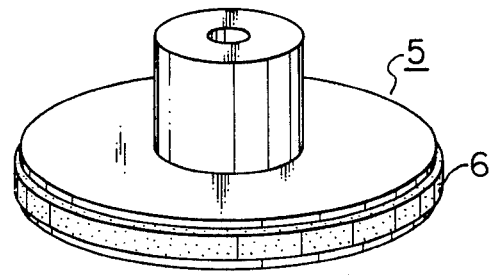

In the accompanied drawings,

FIG. 1 is a front view with partially cross-sectional of a motor equipped with a magnetic recording disc a circumference portion of which is coated with the composition for forming a thick magnetic recording medium, FIG. 2 is an enlarged perspective view of the magnetic disc of FIG. 1, and FIG. 3 is a graph showing a weight ratio relationship between the resin components (a), (b) and (c) in the composition of this invention.

As the magnetic particles used in the composition of this invention, there is no particular limit thereto and conventional ones can be used. For example, there can be used Fe, $\gamma\text{-}Fe_2O_3$, $Fe_3O_4$, Co-ferrite magnetic particles, Ba-ferrite magnetic particles, Zn-ferrite magnetic particles, $CrO_2$, various alloy particles such as Fe-Co series, Fe-Co-Ni series, Co-Ni series, and Co series. Among them, needle Fe particles are particularly preferable from the viewpoint of output voltage and kneading properties.

The magnetic particles should be used in 70% by weight or less based on the total solid contents. If the amount is more than 70% by weight, cracks are produced and the desired thick film cannot be formed. Further, if the amount of magnetic particles is too small, the magnetic recording itself on the magnetic recording medium produced becomes impossible. Usually, 50% by weight or more of magnetic particles is sufficient and sometimes the amount of magnetic particles can be 45% by weight or 40% by weight.

The resin mixture used in the composition of this invention comprises (a) an epoxy resin, (b) a phenol resin, and (c) polyvinyl butyral, the weight ratio of the phenol resin to the epoxy resin (b)/(a) being 2.5/7.5 to 4/6 and the weight ratio of the polyvinyl butyral to the total of the epoxy resin and the phenol resin (c)/(a)+(b) being 2.5/7.5 to 4/6.

The epoxy resin (a) is used for imparting adhesive strength to the composition on a substrate. As the epoxy resin, there can be used ones having a molecular weight of preferably 2000 to 60,000, more preferably 10,000 to 25,000. Concrete examples of the epoxy resin are Epikote 1007, 1009 (trade names, manufactured by Shell Chemical Co.), Araldite 6097, 488N-40, (trade names, manufacture by Ciba (A.R.L.) Ltd.), etc. Among them, Araldite 488N-40 having a molecular weight of 10,000 to 25,000 is preferable from the viewpoint of resistance to cracks. These epoxy resins can be used alone or as a mixture thereof.

The phenol resin (b) is used for improving the strength of formed film and seems to function as a curing agent for the epoxy resin at the time of curing of the resin components. As the phenol resin, there can be used both novolak type and resol type and modified phenol resins. Phenol resins having a molecular weight of 500 to 2000 are preferably used. Concrete examples of the phenol resin are Hitanol 4010 (trade name, manufactured by Hitachi Chemical Co., Ltd.), Bakelite BKR 2620 (trade name, manufactured by Union Carbide Corp.), etc. These phenol resins can be used alone or as a mixture thereof.

The polyvinyl butyral (c) is used for preventing cracks and improving screen printing properties and is selected from those which have good compatibility with the epoxy resin and the phenol resin (in relation to viscosity). It is preferable to use polyvinyl butyral having a higher molecular weight, for example, 30,000 or more, but polyvinyl butyral having a molecular weight of less than 30,000 can also be used alone. A mixture of polyvinyl butyral having a higher molecular weight, e.g., 30,000 or more and that having a lower molecular weight, e.g., 30,000 or less can preferably be used for improving kneading properties of the composition of this invention. Concrete examples of the polyvinyl butyral are Vinylite XYHL (trade name, manufactured by Union Carbide Corp.), Eslex BX-1 (trade name, manufactured by Sekisui Chemical Co., Ltd.), etc.

The above-mentioned resin components (a), (b) and (c) should be used in the range of (b)/(a)=2.5/7.5 to 4/6 and (c)/(a)+(b)=2.5/7.5 to 4/6. Said range corresponds to the area A in FIG. 3. Referring to FIG. 3, if the ratio (b)/(a) is larger than 4/6, there mainly take place cracks on the film formed in the area D, there mainly takes place lowering in screen printing properties to fail to carry out screen printing in the area E, and there mainly takes place insufficiency in strength of the film formed in the area C. There also shows the same tendency when the ratio (b)/(a) is smaller than 2.5/7.5. Further, when the ratio (b)/(a) is smaller than 1/9, sufficient curing of the resins cannot be obtained in the area B. On the other hand, when the ratio (c)/(a)+(b) is larger than 4/6, there mainly takes place insufficiency in strength of the film formed in the area C. When the ratio (c)/(a)+(b) is smaller than 2.5/7.5, there mainly take place cracks on the film formed in the area D and lowering in screen printing properties to fail to carry out screen printing in the area E.

When the weight ratio of phenol resin to epoxy resin (b)/(a) is 3/7 and the weight ratio of polyvinyl butyral to the total of epoxy resin and phenol resin (c)/(a)+(b) is ½, there can be obtained a desired thick magnetic recording medium particularly excellent in properties.

In order to carry out screen printing by using the composition of this invention, 126 to 250 parts by weight, preferably 150 to 200 parts by weight of solvent is added to 100 parts by weight of the magnetic particles and the resin mixture. A half or more by weight of the solvent should be an organic solvent having a boiling point of 200° C. or higher. If the amount of organic solvent having a boiling point of 200° C. or higher is less than a half of the total amount of solvent, the composition comprising magnetic particles and the resin components will be dried and solidified undesirably on the screen during the screen printing. Examples of organic solvents having a boiling point of 200° C. or higher are diethylene glycol monobutyl ether (e.g., butyl Carbitol, a trademark, manufactured by Union Carbide Corp.), diethylene glycol, etc.

The solvent may contain in addition to the organic solvent having a boiling point of 200° C. or higher one or more organic solvents having a lower boiling point conventionally used as solvents for epoxy resins, phenol resins and polyvinyl butyral such as methyl ethyl ketone, xylene, butanol, etc. The use of methyl ethyl ketone is preferable from the viewpoint of not destroying the emulsion of screen.

The composition of this invention may further contain a small amount of one or more dispersing agents in order to improve dispersibility of magnetic particles such as Fe particles, viscosity lowering agents, surface active agents, and the like. Further, the composition of this invention may contain inorganic fine particles such as colloidal silica in order to make it possible to thicken the film formed further.

The above-mentioned ingredients can be kneaded by a conventional method using, for example, a ball mill, a kneader, or the like to give the composition for screen printing.

The resulting composition for screen printing is coated on a substrate such as a magnetic recording disc by a conventional screen printing and cured to give a thick magnetic recording layer or film (or medium) having a thickness of 10 $\mu$m to 200 $\mu$m, preferably 50 $\mu$m to 200 $\mu$m by one time of coating. Curing of the composition can be carried out usually heating at 170°–220° C. in $N_2$ gas for 60–150 minutes.

A magnetic recording disc obtained by using the composition of this invention is explained concretely referring to FIGS. 1 and 2.

In FIGS. 1 and 2, numeral 1 denotes a motor, numeral 2 an output shaft, numeral 2A a shaft opposite to the output shaft, numeral 3 a substrate, numeral 4 a magnetic sensor, numeral 5 a magnetic recording disc and numeral 6 a magnetic film. When servo-controlling properties are desired, the use of a direct current motor as the motor 1 is preferable. The output shaft 2 projected from one side of the motor is used for transmitting revolving torque of the motor 1 to outer portion and the shaft opposite to the output shaft 2A is used for installing the magnetic recording disc 5. The substrate 3 is a material such as a printed board having circuit-like conductors on the surfaces thereof and functions for fixing the magnetic sensor 4, and insulating the electric circuit portions from the motor 1 and as intermediate connector for taking out the output of the magnetic sensor 4 to outer portion. The magnetic film 6 is obtained by coating the composition of this invention containing a special solvent mixture by curved-surface screen printing. In the case of coating the composition on a flat surface of the magnetic recording disc 5, there can be employed flat-surface screen printing. Sometimes, it is effective to polish the surface of magnetic material coating by some means for increasing the output voltages. As the material for magnetic recording disc 5, there can preferably be used aluminum, plastics such as polyphenylene sulfide, polycarbonate and these polymers containing inorganic fillers, polyacetal, and the like.

According to this invention, it is possible to form freely a magnetic recording medium having a thickness of 10 to 200 $\mu$m, particularly 50 to 200 $\mu$m in accordance with output lowering due to the space between the magnetic sensor 4 and the magnetic film 6. Further, cracks producable at the time of thick film formation can be prevented by kneading polyvinyl butyral having a high molecular weight with magnetic particles prior to the mixing with the rest of the components of the composition. Further, by mixing with solvents at least a half of which is an organic solvent having a boiling point of 200° C. or higher, there can be obtained a composition having slight or almost no viscosity change. In addition, there can be expected an effect that magnetic particles orientation after the coating is also possible.

Moreover, since a magnetic film having a sufficient thickness and uniform thickness can be formed around the outer circumference of magnetic recording disc by one coating according to this invention, the coating step can be finished in a very short time, for example, the coating around the outer circumference of one magnetic recording disc can be completed in 5 seconds. Further, since the film thickness in every portion of the outer circumference of the magnetic recording disc is uniform, the magnetic film having a higher density can easily be formed by magnetic particles orientation.

Adhesive strength of the composition of this invention after curing is 100 kg/cm² or more and also the resulting film is good in polishing properties, so that higher output voltages can be expected by polishing the film so as to make the surface smoother.

Sensor bridge output voltages at individual spacings between the magnetic film on the outer circumference of the magnetic recording disc mentioned above and individual sensors are about 125-120 mVp-p at spacing of 10-20 μm, 110 mVp-p at spacing of 30 μm, 70 mVp-p at spacing of 40 μm, 40 mVp-p at spacing of 50 μm, and 20 mVp-p at spacing of 60 μm under the conditions of sensors 20 μm wide, recording wavelength λ=83 μm, film thickness 80 μm and using permalloy as reproducing head. As is clear from the above-mentioned results, even when the recording wavelength (λ) is very short such as 83 μm, a sufficient output can be obtained when the magnetic recording composition of this invention is used. Further, it is clear that higher output can be obtained when the recording wavelength (λ) becomes longer due to lesser mutual interference between magnetic poles.

The above-mentioned explanation is given to the disc type magnetic recording disc, but the same good results can also be obtained when applied to a drum type. Further, the composition of this invention can generally be used for forming a linear magnetic recording medium with high performance such as for controlling robots and the like, other than for the magnetic recording disc mentioned above.

This invention is illustrated by way of the following Examples, wherein all parts are by weight unless otherwise specified.

EXAMPLE 1

| Ingredients | Solid content (parts) | Solvent (parts) | Total (parts) |
|---|---|---|---|
| Magnetic Fe particles | 70.0 | — | 70.0 |
| Epoxy resin (Araldite 488N-40) | 15.4 | — | } 38.5 |
| Methyl ethyl ketone | — | 23.1 | |
| Phenol resin (Hitanol 4010) | 6.6 | — | } 13.2 |
| Xylene + butanol | — | 6.6 | |
| Polyvinyl butyral (PVB.. BX-1, mol. wt. 30,000 or more) | 8.0 | — | } 114.3 |
| Butyl Carbitol:methyl ethyl ketone = 80:20 | — | 106.3 | |
| Butyl Carbitol | — | 34.0 | 34.0 |
| Total | 100.0 | 170.0 | 270.0 |

The above-mentioned ingredients were kneaded in a ball mill to give a composition containing 100 parts of solids and 170 parts of solvents in which butyl Carbitol was present more than ½. The resulting composition was coated on a magnetic recording disc 5 as shown in FIGS. 1 and 2 by curved-surface screen printing so as to make the film thickness 50 μm and cured by heating at 200° C. in N₂ gas for 120 minutes to give a magnetic film 6. The screen printing properties were very good. The thus obtained magnetic film had no cracks and was excellent in film strength.

EXAMPLE 2

| Ingredients | Solid content (parts) | Solvent (parts) | Total (parts) |
|---|---|---|---|
| Magnetic Fe particles | 70.0 | — | 70.0 |
| Epoxy resin (Araldite 488N-40) | 15.4 | — | } 28.5 |
| Methyl ethyl ketone | — | 23.1 | |
| Phenol resin (Hitanol 4010) | 6.6 | — | } 13.2 |
| Xylene + butanol | — | 6.6 | |
| Polyvinyl butyral (PVB.. BX-1, mol. wt. 30,000 or more) | 6.0 | — | } 75.0 |
| Butyl Carbitol:methyl ethyl ketone = 80:20 | — | 69.0 | |
| Polyvinyl butyral (PVB.. BL-1, mol. wt. 30,000 or less) | 2.0 | — | } 10.0 |
| Butyl Carbitol | — | 8.0 | |
| Butyl Carbitol | — | 63.3 | 63.3 |
| Total | 100.0 | 170.0 | 270.0 |

The above-mentioned ingredients were kneaded, coated and cured under the same conditions as described in Example 1 to give a magnetic film 6. The screen printing properties were very good as in Example 1. The thus obtained magnetic film had no cracks and was excellent in film strength. Further, since the polyvinyl butyral having a molecular weight of 30,000 or less is co-used, kneading properties were also improved.

EXAMPLE 3

| Ingredients | Solid content (parts) | Solvent (parts) | Total (parts) |
|---|---|---|---|
| Magnetic Fe particles | 70.0 | — | 70.0 |
| Epoxy resin (Araldite 488N-40) | 14.0 | — | } 35.0 |
| Methyl ethyl ketone | — | 21.0 | |
| Phenol resin (Hitanol 4010) | 6.0 | — | } 12.0 |
| Xylene + butanol | — | 6.0 | |
| Polyvinyl butyral (PVB.. BL-1, mol. wt. 30,000 or less) | 10.0 | — | } 142.9 |
| Butyl Carbitol | — | 132.9 | |

-continued

| Ingredients | Solid content (parts) | Solvent (parts) | Total (parts) |
|---|---|---|---|
| Butyl Carbitol | — | 20.1 | 20.1 |
| Total | 100.0 | 180.0 | 280.0 |

The above-mentioned ingredients were kneaded, coated and cured under the same conditions as described in Example 1 to give a magnetic film 6. Since the polyvinyl butyral (molecular weight 30,000 or less) was used in a larger amount than Examples 1 and 2, the resulting magnetic film was superior in resistance to cracks, screen printing properties and durability to those of Examples 1 and 2.

COMPARATIVE EXAMPLE 1

| Ingredients | Solid content (parts) | Solvent (parts) | Total (parts) |
|---|---|---|---|
| Magnetic Fe particles | 72.0 | — | 72.0 |
| Epoxy resin (Araldite 488N-40) | 16.0 | — | 40.0 |
| Methyl ethyl ketone | — | 24.0 | |
| Phenol resin (Hitanol 4010) | 4.0 | — | 8.0 |
| Xylene + butanol | — | 4.0 | |
| Polyvinyl butyral (PVB.. BX-1, mol. wt. 30,000 or more) | 8.0 | — | 114.3 |
| Butyl Carbitol:methyl ethyl ketone = 80:20 | — | 106.3 | |
| Butyl Carbitol | — | 35.7 | 35.7 |
| Total | 100.0 | 170.0 | 270.0 |

The above-mentioned ingredients were kneaded, coated and cured under the same conditions as described in Example 1 to give a magnetic film 6, but no magnetic film practically usable was obtained due to the generation of cracks.

What is claimed is:

1. A composition for forming a thick magnetic recording medium comprising 70% by weight or less of magnetic particles and 30% by weight or more of a resin mixture of (a) an epoxy resin, (b) a phenol resin, and (c) polyvinyl butyral, the weight ratio of the phenol resin to the epoxy resin ((b)/(a)) being 2.5/7.5 to 4/6 and the weight ratio of the polyvinyl butyral to the total of phenol resin plus epoxy resin ((c)/(a)+(b)) being 2.5/7.5 to 4/6.

2. A composition according to claim 1, wherein the epoxy resin has a molecular weight of 10,000 to 25,000.

3. A composition according to claim 1, wherein the polyvinyl butyral has a molecular weight of 30,000 or more.

4. A composition according to claim 1, wherein the phenol resin has a molecular weight of 500 to 2,000.

5. A composition for forming a thick magnetic recording medium by a screen printing method comprising
   (i) 100 parts by weight of a mixture comprising 70% by weight or less of magnetic particles and 30% by weight or more of a resin mixture of (a) an epoxy resin, (b) a phenol resin, and (c) polyvinyl butyral, the weight ratio of the phenol resin to the epoxy resin ((b)/(a)) being 2.5/7.5 to 4/6 and the weight ratio of the polyvinyl butyral to the total of epoxy resin plus phenol resin ((c)/(a)+(b)) being 2.5/7.5 to 4/6, and
   (ii) 126 to 250 parts by weight of an organic solvent, at least ½ of which should be an organic solvent having a boiling point of 200° C. or higher.

6. A composition according to claim 5, wherein the epoxy resin has a molecular weight of 10,000 to 25,000.

7. A composition according to claim 5, wherein the phenol resin has a molecular weight of 500 to 2000.

8. A composition according to claim 5, wherein the polyvinyl butyral has a molecular weight of 30,000 or more.

9. A composition according to claim 5, wherein the polyvinyl butyral is a mixture of polyvinyl butyral having a molecular weight of 30,000 or more and polyvinyl butyral having a molecular weight of less than 30,000.

10. A composition according to claim 1, wherein the weight ratio of the phenol resin to the epoxy resin ((b)/(a)) is 3/7 and the weight ratio of the polyvinyl butyral to the total of phenol resin plus epoxy resin ((c)/(a)+(b)) is ½.

11. A composition according to claim 5, wherein the weight ratio of the phenol resin to the epoxy resin ((b)/(a)) is 3/7 and the weight ratio of the polyvinyl butyral to the total of phenol resin plus epoxy resin ((c)/(a)+(b)) is ½.

12. A composition according to claim 5, wherein the organic solvent having a boiling point of 200° C. or higher is diethylene glycol monobutyl ether.

13. A thick magnetic recording medium formed on a substrate by using the composition of claim 1.

14. A thick magnetic recording medium formed on a substrate by screen printing method using the composition of claim 5.

15. A magnetic recording medium according to claim 13, wherein the substrate is a magnetic recording disc.

16. A magnetic recording medium according to claim 15, wherein the magnetic recording disc is used in a magnetic rotary encoder.

* * * * *